US006414462B2

United States Patent
Chong

(10) Patent No.: US 6,414,462 B2
(45) Date of Patent: Jul. 2, 2002

(54) SPEED CONTROL APPARATUS FOR SYNCHRONOUS RELUCTANCE MOTOR

(75) Inventor: Dal-Ho Chong, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/814,935

(22) Filed: Mar. 23, 2001

(30) Foreign Application Priority Data

Mar. 25, 2000 (KR) .............................................. 00/15348

(51) Int. Cl.[7] ................................................. H02P 5/40
(52) U.S. Cl. ........................ 318/701; 318/700; 318/713; 318/715
(58) Field of Search ................................. 318/700, 701, 318/799, 715, 713, 808, 805

(56) References Cited

U.S. PATENT DOCUMENTS

| | | | | |
|---|---|---|---|---|
| 4,088,934 A | * | 5/1978 | D'Atre et al. | 318/227 |
| 4,740,738 A | * | 4/1988 | El-Antably et al. | 318/701 |
| 5,701,066 A | * | 12/1997 | Matsuura et al. | 318/808 |
| 5,936,378 A | * | 8/1999 | Iijima et al. | 318/807 |
| 5,994,870 A | * | 11/1999 | Kaneko et al. | 318/798 |
| 6,078,119 A | * | 6/2000 | Satoh et al. | 310/90.5 |
| 6,281,656 B1 | * | 8/2001 | Masaki et al. | 318/700 |

* cited by examiner

Primary Examiner—Robert E. Nappi
Assistant Examiner—Rita Leykin
(74) Attorney, Agent, or Firm—Birch, Stewart, Kolasch & Birch, LLP

(57) ABSTRACT

A speed control apparatus for a synchronous reluctance motor is disclosed. The speed control apparatus includes a voltage detector for detecting a voltage applied to the motor, a first phase converter for receiving voltages in three phases from the voltage detector and converting the three-phase voltages into equivalent voltages in two phases, a current detector for detecting a current applied to the motor, a second phase converter for receiving currents in three phases from the current detector and converting the three-phase currents into equivalent currents in two phases, and a rotor speed operator for receiving the two-phase voltages thereby computing a speed of a rotor included in the motor. A speed controller for receiving a deviation between a speed command externally inputted and an output value from the rotor speed operator is provided for generating a torque-related current command. A current controller receives a deviation between a torque current command externally inputted and an output value from the rotor speed operator thereby outputting a torque-related current command. A current controller for receives a deviation between the torque-related current command and a torque-related current outputted from the second phase converter, thereby outputting a torque-related voltage command along with a magnetic-flux-related voltage command.

14 Claims, 5 Drawing Sheets

SPEED CONTROL APPARATUS FOR SYNCHRONOUS RELUCTANCE MOTOR

BACKGROUND OF THE INVENTION

1. Field of the Invention

The present invention relates to a speed control apparatus for a synchronous reluctance motor, and more particularly to a speed control apparatus for a synchronous reluctance motor which can accurately control the rotating speed of the motor, in accordance with a variation in load, without using any sensor adapted to detect the position of a rotor included in the motor.

2. Description of the Related Art

A synchronous motor, which is a kind of an AC motor, is a constant-speed motor which rotates at a fixed speed, irrespective of the load applied thereto at a certain frequency, that is, at a synchronous speed. In particular, in a synchronous reluctance motor, torque is generated, based on reluctance components. Accordingly, the rotation of the rotor included in the synchronous reluctance motor results from only a reluctance torque.

FIG. 1 is a plan view schematically illustrating a configuration of a conventional three-phase synchronous reluctance motor.

Referring to FIG. 1, the conventional three-phase synchronous reluctance motor, which is denoted by the reference numeral 100, includes a stator 101 adapted to create a rotating magnetic field upon receiving an AC voltage applied thereof, and a rotor 102 arranged inside the stator 101 and adapted to rotate by virtue of the rotating magnetic field created by the stator 101.

As shown in FIG. 2, the rotor 102 is divided into four regions each formed with grooves 102h. The grooves 102h of each rotor region are symmetrical with those of a facing one of the remaining rotor regions. The grooves 10h are adapted to generate an increased difference between a reluctance generated in a d-axis direction and a reluctance generated in a q-axis direction, thereby generating a reluctance torque for rotating the rotor 102. In FIG. 2, the reference numeral 102f denotes a flow of magnetic flux generated by virtue of the magnetic field created by the stator 101.

FIG. 3 is a block diagram schematically illustrating a conventional speed control apparatus applied to a three-phase synchronous reluctance motor having the above-mentioned configuration.

As seen in FIG. 3, the conventional speed control apparatus includes a speed controller 301 for receiving a deviation between a speed command value outputted from a main control unit (not shown) and an actual speed of the three-phase synchronous reluctance motor 310 detected by a rotor position detector 309. The speed controller 301 controls the speed of a rotor 102 included in a synchronous reluctance motor 310 based on the speed deviation. The speed control apparatus also includes a magnetic flux command generator 305 for receiving an output signal from the rotor position detector 309 and computing a magnetic flux angle of the rotor 102 based on the received output signal.

The speed control apparatus also includes a magnetic flux angle operator 307 for receiving an output signal from the rotor position detector 309, thereby computing a magnetic flux angle of the rotor; a coordinate converter 308 for conducting a coordinate conversion of a three-phase current inputted to the synchronous reluctance motor 310 into a two-phase; and a magnetic flux controller 306 for receiving an output signal from the magnetic flux command generator 305 and an output from the coordinate converter 308, thereby controlling a magnetic flux-related current.

The speed control apparatus further includes a current controller 302 for receiving a deviation between an output signal from the speed controller 301 and the output signal from the coordinate converter 308, along with an output signal from the magnetic flux controller 306, thereby generating a torque-related voltage command and a magnetic flux-related command. The speed control apparatus also includes a voltage generator 303 for receiving the torque-related voltage command and magnetic flux-related command outputted from the current controller 302 and the output signal from the magnetic flux angle operator 307, thereby outputting a three-phase voltage command. An inverter 304 receives the three-phase voltage command from the voltage generator 303 and supplies an AC voltage corresponding to the received three-phase voltage command to the three-phase synchronous reluctance motor 310.

In the conventional speed control apparatus having the above-mentioned configuration, the speed controller 301 receives a deviation between a speed command outputted from the main control unit (not shown) and a speed value of the three-phase synchronous reluctance motor 310 fed back from the rotor position detector 309. The speed controller 301 then outputs a current command $i_{qs}*$ relating to a torque in the q-axis direction of a rotating coordinate system, based on the received speed deviation.

The magnetic flux command generator 305 detects a positive torque range and a positive output range from the output signal from the rotor position detector 309, thereby outputting a current command $i_{ds}*$ relating to magnetic flux in the d-axis direction of the rotating coordinate system. The magnetic flux controller 306 receives a deviation between the magnetic-flux-related current value $i_{ds}*$ outputted from the magnetic flux command generator 305, and a two-phase-converted magnetic-flux-related current value $i_{ds}$ outputted from the coordinate converter 308, thereby controlling a magnetic-flux-related current.

The magnetic flux angle operator 307 receives the output signal from the rotor position detector 309, thereby computing a magnetic flux angle θ of the rotor. Based on the magnetic flux angle θ, the coordinate converter 308 conducts a coordinate conversion for a three-phase current inputted to the synchronous reluctance motor 310 into a two-phase, that is, a q and d-axis phase.

The current controller 302 receives the torque-related current command $i_{qs}*$ and the magnetic-flux-related current command $i_{ds}*$, and generates a torque-related voltage command $V_{qs}*$ and a magnetic-flux-related voltage command $V_{ds}*$, respectively. The torque-related voltage $V_{qs}*$, and magnetic-flux-related voltage commands $V_{ds}*$, are applied to the voltage generator 303, which also receives the magnetic flux angle θ from the magnetic flux angle operator 307. Based on these received signals, the voltage generator 303 outputs three-phase voltage commands $V_{as}$, $V_{bs}$, and $V_{cs}$. The inverter 304 then applies a corresponding voltage to the synchronous reluctance motor 310 based on the three-phase voltage commands $V_{as}$, $V_{bs}$, and $V_{cs}$.

In a speed control apparatus according to the above-mentioned conventional synchronous reluctance motor, a sensor such as an encoder or a hall IC is used for the rotor position detector 309 and adapted to obtain information about the position of the rotor. However, there are various technical difficulties with an application of such a sensor to refrigerators or air conditioners.

SUMMARY OF THE INVENTION

The present invention has been made in view of the above mentioned problems, and an object of the invention is to provide a speed control apparatus for a synchronous reluctance motor which can accurately control the rotating speed of the motor by detecting only the current and voltage of each phase flowing in the motor without using any separate sensor that is necessarily adapted to detect the position of a rotor included in the motor.

These and other objects are accomplished by a speed control apparatus for a synchronous reluctance motor comprising a voltage detector for detecting a voltage applied to the synchronous reluctance motor; a first phase converter for receiving voltages in three phases outputted from the voltage detector based on the voltage detection thereof, and converting the three-phase voltages into equivalent voltages in two phases; a current detector for detecting a current applied to the synchronous reluctance motor; a second phase converter for receiving currents in three phases outputted from the current detector based on the current detection thereof, and converting the three-phase currents into equivalent currents in two phases; and a rotor speed operator for receiving the two-phase voltages outputted from the first phase converter, thereby computing a speed of a rotor included in the synchronous reluctance motor.

These and other objects are further accomplished by a method of controlling operating speed and operating torque for a synchronous reluctance motor, the method comprising the steps of detecting each phase current and each phase voltage of said motor; and controlling rotating speed and torque of said motor based on inductance variations determined from each phase current and each phase voltage of a stator of said motor.

In accordance with the present invention, it is possible to accurately control the rotating speed and torque of the motor by detecting only the current and voltage applied to the motor without using any separate sensor adapted to detect the position of a rotor included in the motor. In order to achieve an enhancement in control accuracy, an inductance calculation is conducted, and an inductance compensation is carried out based on the result of the inductance calculation.

Advantages of the present invention will become more apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION OF THE PREFERRED EMBODIMENTS

Figure 4:
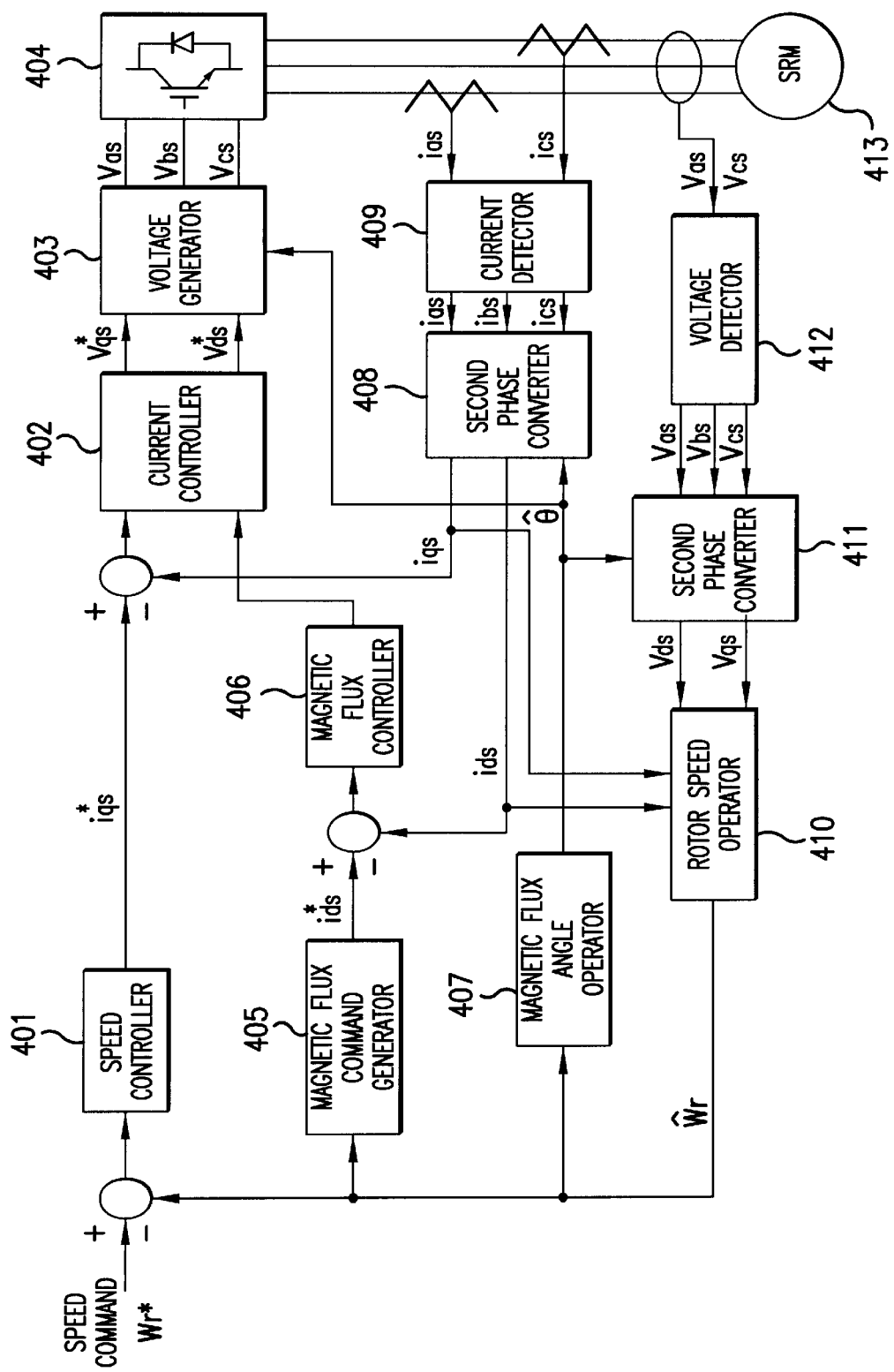
FIG. 4 is a block diagram illustrating a speed control apparatus for a synchronous reluctance motor according to the present invention.

Referring to FIG. 4, a speed control apparatus for a synchronous reluctance motor according to the present invention is illustrated. As shown in FIG. 4, the speed control apparatus includes a voltage detector 412 for detecting a voltage applied to the synchronous reluctance motor denoted by the reference numeral 413, a first phase converter 411 for receiving voltages $V_{as}$, $V_{bs}$, and $V_{cs}$, in three phases outputted from the voltage detector 412 based on the voltage detection thereof, and converting those three-phase voltages $V_{as}$, $V_{bs}$, and $V_{cs}$ into equivalent voltages $V_{ds}$ and $V_{qs}$ in two phases.

A current detector 409 for detecting a current applied to the synchronous reluctance motor 413 is provided with a second phase converter 408 for receiving currents $i_{as}$, $i_{bs}$, and $i_{cs}$ in three phases outputted from the current detector 409, and converting those three-phase currents $i_{as}$, $i_{bs}$ and $i_{cs}$ into equivalent currents $i_{ds}$, and $i_{qs}$ in two phases.

The speed control apparatus also includes a rotor speed operator 410 for receiving the two-phase voltages $V_{ds}$ and $V_{qs}$ outputted from the first phase converter 411, thereby computing the speed of a rotor included in the synchronous reluctance motor 413. A speed controller 401 for receiving a deviation between a speed command $\omega_r^*$ externally inputted and an output value $\hat{\omega}_r$ from the rotor speed operator 410 is provided for generating a current command $i_{qs}^*$ relating to torque in the q-axis direction of a rotating coordinate system.

A magnetic flux command generator 405 for receiving the output signal from the rotor speed operator 410 is provided for detecting a positive torque range and a positive output range in accordance with the rotating speed of the synchronous reluctance motor 413, and outputting a current command $i_{ds}^*$ relating to magnetic flux in the d-axis direction of the rotating coordinate system. A magnetic flux controller 406 for receiving a deviation between the output signal $i_{ds}^*$ from the magnetic command generator 405 and the current $i_{ds}$ from the second phase converter 408 relating to magnetic flux in the d-axis direction of the rotating coordinate system is provided for controlling magnetic flux.

The speed control apparatus further includes a magnetic flux angle operator 407 for receiving the output signal from the rotor speed operator 410, thereby computing a magnetic flux angle $\hat{\theta}$ for a coordinate conversion. A current controller 402 for receiving a deviation between the torque current command $i_{qs}^*$ from the speed controller 401 and the current $i_{qs}$ from the second phase converter 408 relating to torque in the q-axis direction of the rotating coordinate system, along with an output signal from the magnetic flux controller 406, outputs a torque-related voltage command $V_{qs}^*$ and a magnetic-flux-related voltage command $V_{ds}^*$ to the voltage generator 403.

The voltage generator 403 converts the two-phase voltage commands $V_{qs}^*$ and $V_{ds}^*$ into voltages $V_{as}$, $V_{bs}$, and $V_{cs}$ in three phases, and then outputs the three-phase voltages $V_{as}$, $V_{bs}$, and $V_{cs}$. An inverter 404 receives the three-phase voltages $V_{as}$, $V_{bs}$, and $V_{cs}$ from the voltage generator 403, conducts a pulse width modulation for those three-phase voltages $V_{as}$, $V_{bs}$, and $V_{cs}$, and applies the resultant modulated voltages to the synchronous reluctance motor 413.

Figure 5:
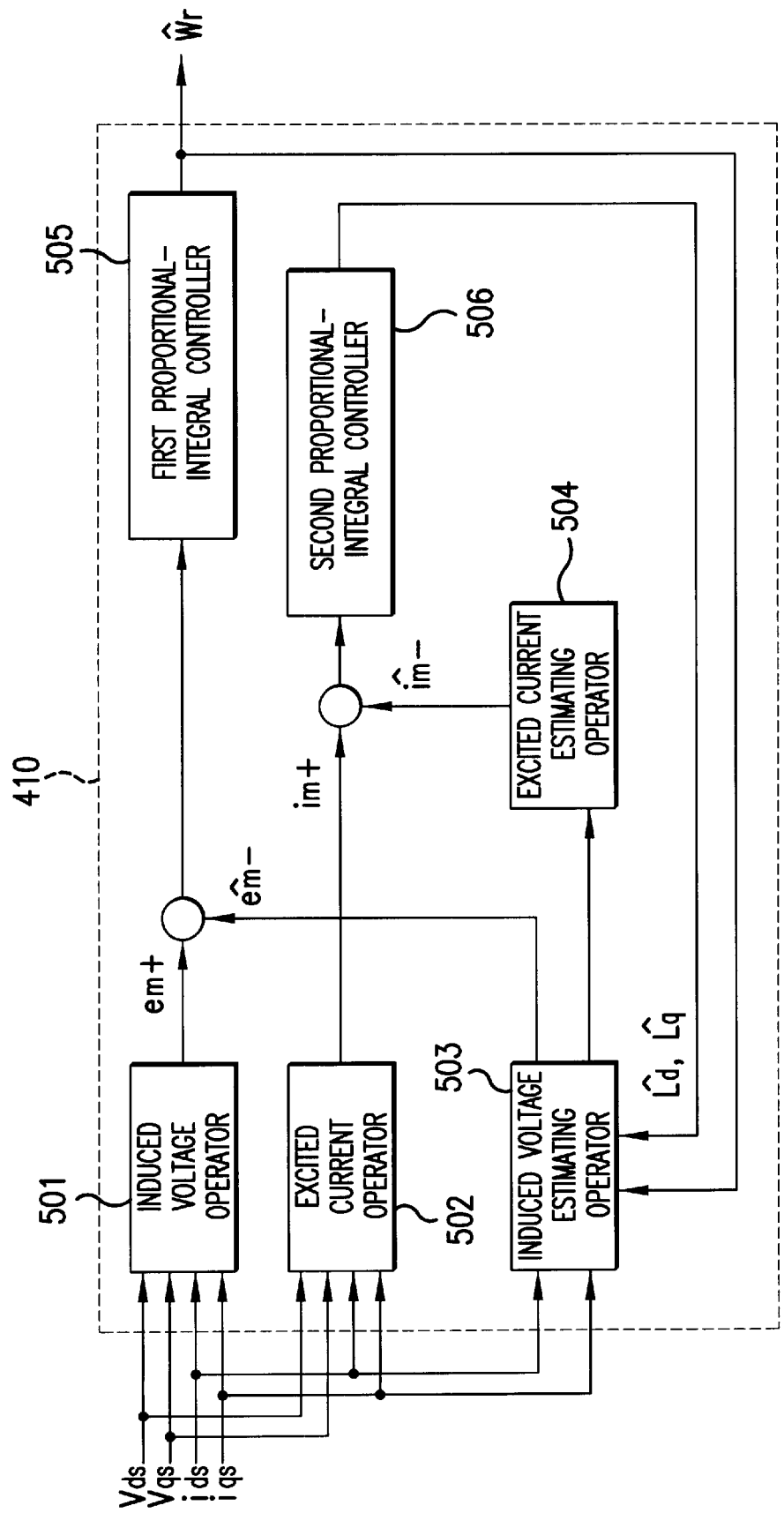
FIG. 5 is a block diagram illustrating a rotor speed operator included in the speed control apparatus of FIG. 4.

As shown in FIG. 5, the rotor speed operator 410 includes an induced voltage operator 501 for receiving respective outputs from the first and second phase converters 411 and 408, and calculating the voltage actually induced in the motor 413. An excited current operator 502 for receiving respective outputs from the first and second phase converters 411 and 408 is provided which calculates an excited current in the motor 413.

An induced voltage estimating operator 503 for receiving the output from the second phase converter 408, estimates a voltage induced in the motor 413. An excited current estimating operator 504 receives an output from the induced voltage estimating operator 503, thereby estimating a current excited in the motor 413.

The rotor speed operator 410 includes a first proportional-integral controller 505 for receiving a deviation between respective outputs from the induced voltage operator 501 and induced voltage estimating operator 503, thereby conducting a proportional-integral control. The rotor speed operator 410 also includes a second proportional-integral controller 506 for receiving a deviation between respective outputs from the excited current operator 502 and excited current estimating operator 504, thereby conducting a proportional-integral control.

The operation of the speed control apparatus of the present invention having the above-mentioned configuration will now be described in conjunction with FIGS. 4 to 8.

The speed controller 401 receives a deviation between a speed command $\omega_r^*$ inputted from the main control unit (not shown) to the system and a speed value $\hat{\omega}_r$ estimated for a speed of the synchronous reluctance motor 413 and fed back from the rotor speed operator 410. The speed controller 401 then generates a current command $i_{qs}^*$ relating to torque in the q-axis direction of the rotating coordinate system based on these received values.

The magnetic flux command generator 405 receives the estimated speed value $\hat{\omega}_r$, detects a positive torque range and a positive output range, and outputs a current command $i_{ds}^*$ relating to magnetic flux in the d-axis direction of the rotating coordinate system. The magnetic flux controller 406 receives a deviation between the magnetic-flux-related current command $i_{ds}^*$ from the magnetic flux command generator 405 and a current $i_{ds}$ from the second phase converter 408 relating to magnetic flux in the d-axis of the rotating coordinate system. The magnetic flux controller 406 controls magnetic flux in response to the received deviation.

The estimated speed value $\hat{\omega}_r$, outputted from the rotor speed operator 410 is also applied to the magnetic flux angle operator 407. The magnetic flux operator 407, in turn, computes a magnetic flux angle θ of the rotor based on the received value. The first and second phase converters 411 and 408, respectively, convert voltages in three phases and currents in three phases detected from the synchronous reluctance motor 413 and based on the magnetic flux angle θ, into two phases corresponding to the q and d-axes of the rotating coordinate system, respectively.

The induced voltage operator 501 included in the rotor speed operator 410 receives the two-phase voltages $V_{ds}$ and $V_{qs}$ and the two-phase currents $i_{ds}$, and $i_{qs}$ respectively outputted from the first and second phase converters 411 and 408. The induced voltage operator calculates a voltage actually induced in the synchronous reluctance motor 413 based on the voltages and currents it receives. This induced voltage $e_m$ is derived using the following Equation 1:

$$e_m = V_s - r_s \cdot i_s \qquad \text{[Equation 1]}$$

where, "$e_m$", "$V_s$", and "$i_s$" represent the induced voltage, the input voltage to the motor 413, and the input current to the motor 413, respectively.

In order to achieve an estimation for a speed of the motor 413, a deviation between the output $e_m$ from the induced voltage operator 501 and an output $\hat{e}_m$ from the induced voltage estimation operator 503, "$e_m - \hat{e}_m$", is inputted to the first proportional-integral controller 505. The first proportional-integral controller 505 conducts a proportional-integral control based on the received deviation "$e_m - \hat{e}_m$", thereby outputting an estimated speed $\hat{\omega}_r$ of the motor 413. The speed controller 401 then receives a deviation between the speed command $\omega_r^*$ and the estimated speed $\hat{\omega}_r$, thereby outputting a current command $i_{qs}^*$ relating to torque in the q-axis direction of the rotating coordinate system.

Figure 8:
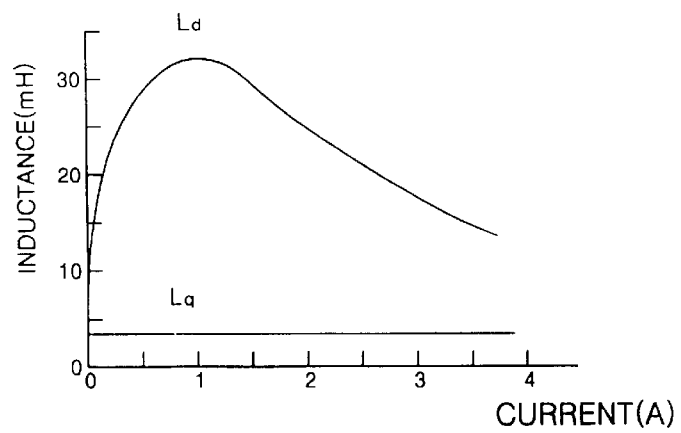
FIG. 8 is a graph depicting a variation in the inductance of a general synchronous reluctance motor depending on a variation in current.

Concurrently, and as shown in FIG. 8, respective inductances $L_d$ and $L_q$ resulting from a load concurrently applied to the motor 413 exhibit different variations from each other in accordance with the input current. Since there is a great difference in inductance between a low load and a high load, it is necessary to compensate for an inductance resulting from a load applied to the motor 413.

Therefore, a deviation between an output $i_m$ from the excited current operator 502 and an output $\hat{i}_m$ from the excited current estimating operator 504, that is, "$i_m - \hat{i}_m$", is applied to the second proportional-integral controller 506. The second proportional-integral controller 506, in turn, conducts a proportional-integral operation for the input value, and outputs the resultant value to the inducted voltage estimating operator 503 so as to achieve an inductance compensation depending on the load applied to the motor 413.

The current controller 402 receives a deviation between the torque-related current command $i_{qs}^*$ and the torque-related current $i_{qs}$ outputted from the second phase converter 408, along with the output signal from the magnetic flux controller 406, thereby outputting a torque-related voltage command $V_{qs}^*$ and a magnetic-flux-related voltage command $V_{ds}^*$. These torque-related voltage $V_{qs}^*$ and magnetic-flux-related voltage commands $V_{ds}^*$ are applied to the voltage generator 403, which also receives the magnetic flux angle θ from the magnetic flux operator 407.

The voltage generator 403 then generates voltages $V_{as}$, $V_{bs}$, and $V_{cs}$, in three phases based on the received values. The three-phase voltages $V_{as}$, $V_{bs}$, and $V_{cs}$ are then applied to the inverter 404, which in turn conducts a pulse width modulation for the applied voltages and applies the resultant voltages to the synchronous reluctance motor 413.

Figure 6:
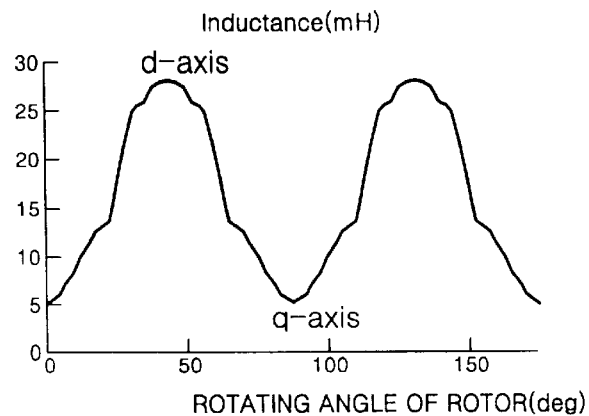
FIG. 6 is a graph depicting a variation in the inductance of a general synchronous reluctance motor.

As shown in FIG. 6, the synchronous reluctance motor 413 exhibits an inductance variation characteristic during a rotation of the rotor conducted in accordance with the three-phase voltages applied to the motor 413. Referring to FIG. 6, it can be found that the inductance variation depends on the rotating angle of the rotor. Accordingly, when the inductance variation is derived by detecting the input voltage and current of the stator included in the motor 413, it is possible to determine the position of the rotor. Thus, the speed of the rotor can be controlled using the derived inductance variation.

Figure 7:
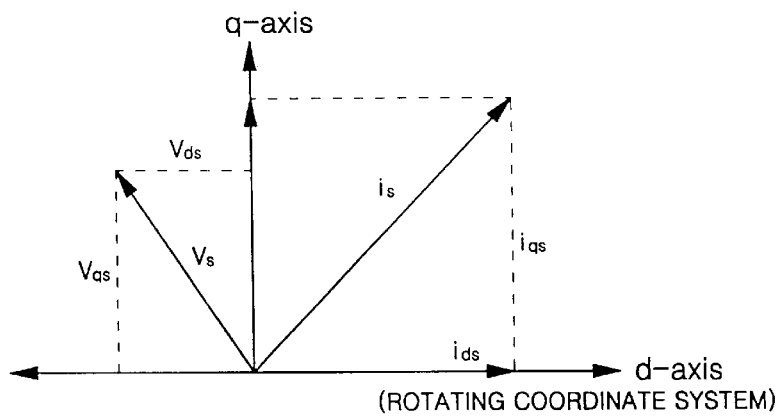
FIG. 7 is a graph depicting respective vector variations of the voltage and current in a general synchronous reluctance motor.

FIG. 7 is a graph depicting the vectors showing the relationships among the position of the rotor, the voltage applied to the motor, and the current applied to the motor.

Referring to the vector diagram of FIG. 7, the voltage applied to the synchronous reluctance motor can be expressed by the following Equations 2 and 3:

$$V_{ds}=r_s i_{ds}+d(\lambda_{ds})/dt-\omega_r\lambda_{qs} \quad \text{[Equation 2]}$$

$$V_{qs}=r_s i_{qs}+d(\lambda_{qs})/dt+\omega_r\lambda_{ds} \quad \text{[Equation 3]}$$

where, "$V_{ds}$" and "$V_{qs}$" represent respective stator voltages in the d and q-axis directions, "$r_s$" represents the resistance of the stator, "$i_{ds}$" and "$i_{qs}$" represent respective stator currents in the d and q-axis directions, "$\lambda_{ds}$" and "$\lambda_{qs}$" respective magnetic fluxes in the d and q-axis directions, and "$\omega_r$" represents the rotor speed of the motor.

Figure 1:
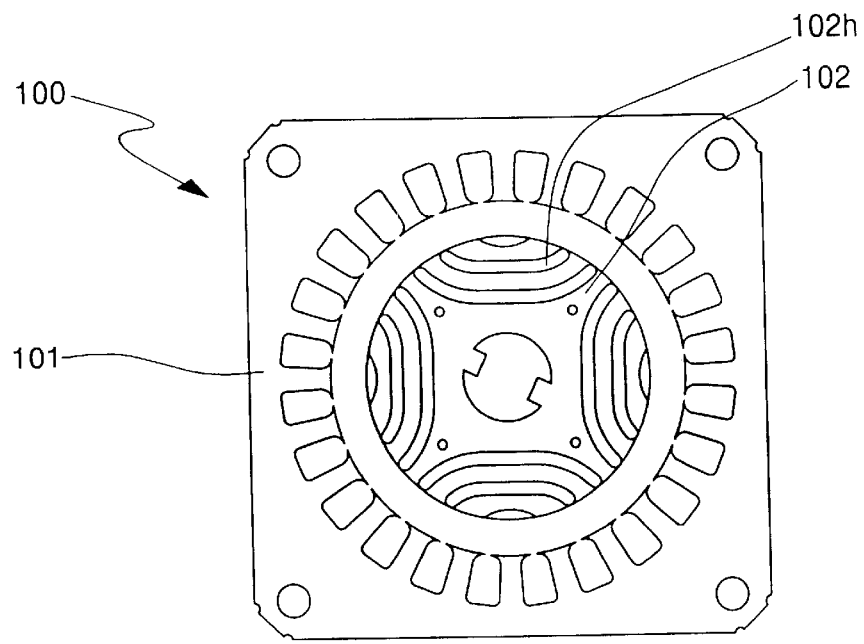
FIG. 1 is a plan view schematically illustrating a configuration of a conventional three-phase synchronous reluctance motor.
Figure 2:
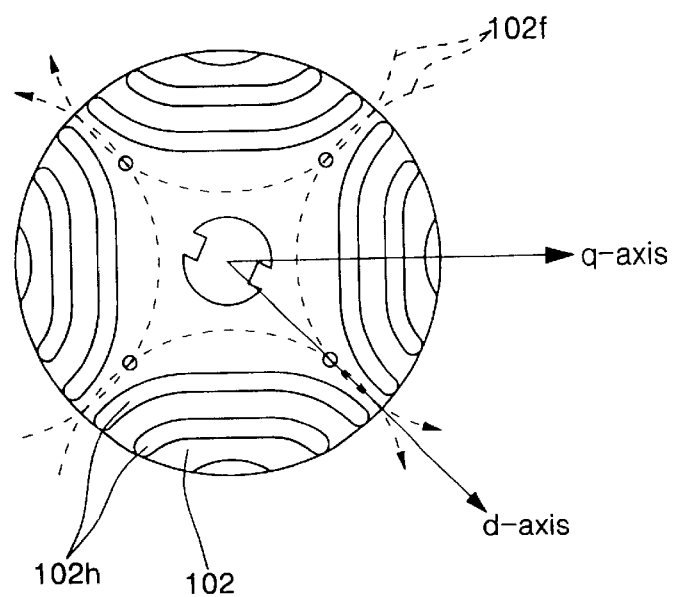
FIG. 2 is a view illustrating the operation of a rotor included in the synchronous reluctance motor shown in FIG. 1.
Figure 3:
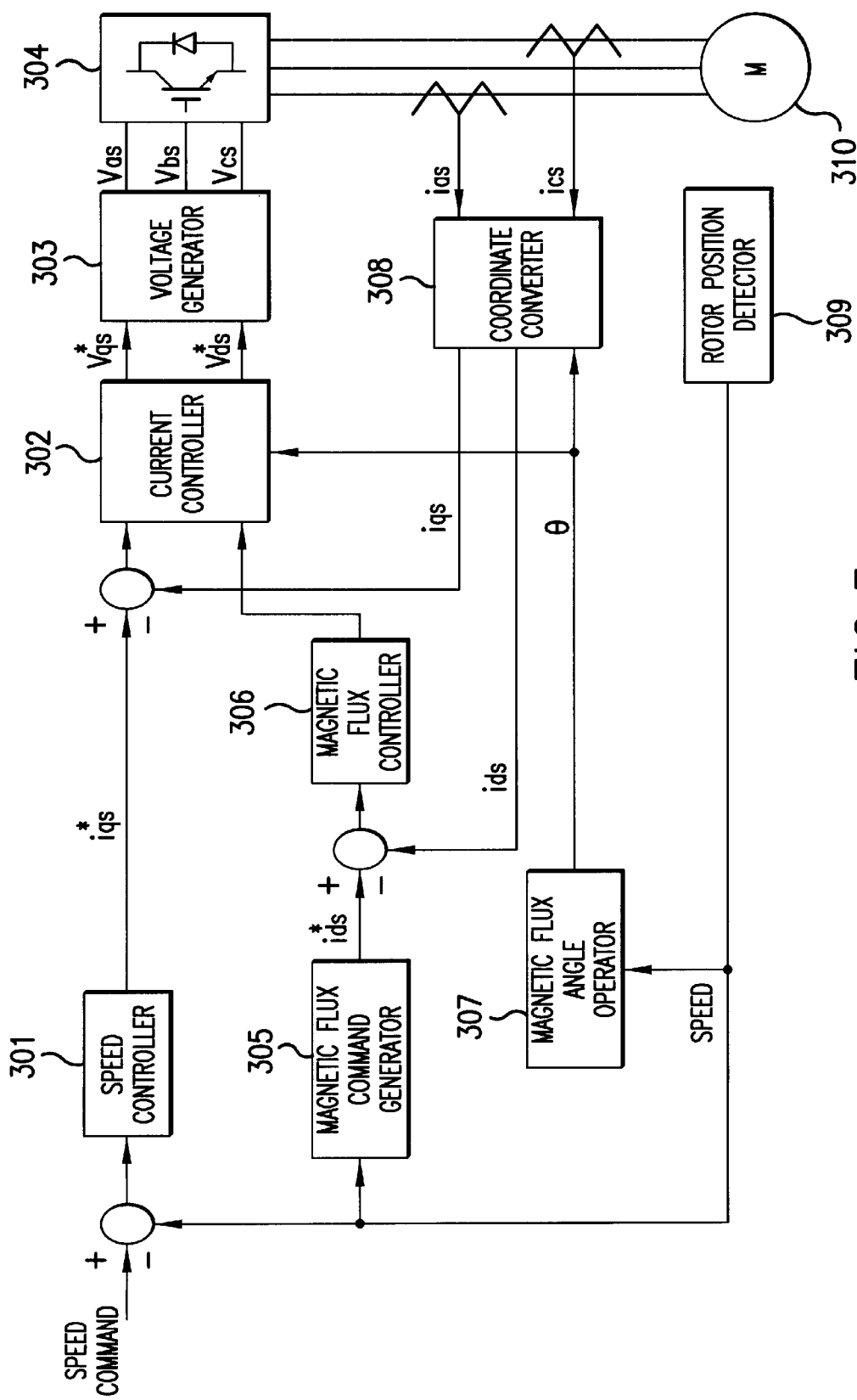
FIG. 3 is a block diagram schematically illustrating a conventional speed control apparatus applied to a three-phase synchronous reluctance motor having the configuration of FIG. 1.

Since $\lambda_{ds}=L_d i_s$, and $\lambda_{qs}=L_q i_s$, it is possible to calculate the d and q-axis inductances $L_d$ and $L_q$ by detecting the associated voltages and currents. Since the calculated d and q-axis inductances vary in accordance with a shifted position of the rotor included in the motor of FIG. 2, it is possible to find information about the position of the rotor by calculating, in real time, those inductances.

Based on the inductance variations, an estimated value $\hat{\omega}_r$ for the rotor speed $\omega_r$ can be calculated. Accordingly, it is possible to control the speed of the motor by comparing the estimated speed $\hat{\omega}_r$ with the speed command $\hat{\omega}_r$.

As is apparent from the above description, the present invention provides a speed control apparatus for a synchronous reluctance motor which can accurately control the rotating speed and torque of the motor by detecting only the current and voltage of each phase flowing in the motor without using any separate sensor, such as an encoder or a hall IC necessarily adapted to detect the position of a rotor included in the motor.

Further, an inductance calculation is conducted and an inductance compensation is carried out based on the result of the inductance calculation in order to achieve an enhancement in control accuracy. Thus, it is possible to achieve an effective control system for the rotating speed of the motor with increased accuracy. In addition, for an application involving a difficult detection for the position and speed of a rotor, such as in the compressor of a refrigerator or air conditioner, the present invention is ideally suited as a means of accurately detecting rotor position and controlling rotor speed with a simplified system.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A speed control apparatus for a synchronous reluctance motor comprising:

a voltage detector for detecting a voltage applied to the synchronous reluctance motor;

a first phase converter for receiving voltages in three phases outputted from the voltage detector based on the voltage detection thereof, and converting the three-phase voltages into equivalent voltages in two phases;

a current detector for detecting a current applied to the synchronous reluctance motor;

a second phase converter for receiving currents in three phases outputted from the current detector based on the current detection thereof, and converting the three-phase currents into equivalent currents in two phases;

a rotor speed operator for receiving the two-phase voltages outputted from the first phase converter, thereby computing a speed of a rotor included in the synchronous reluctance motor;

a speed controller for receiving a deviation between a speed command externally inputted and an output value from the rotor speed operator, thereby generating a torque-related current command;

a current controller for receiving a deviation between a torque current command externally inputted and an output value from the rotor speed operator, thereby outputting a torque-related current command;

a current controller for receiving a deviation between the torque-related current command outputted from the speed controller and a torque-related one of the two-phase currents outputted from the second phase converter, thereby outputting a torque-related voltage command along with a magnetic-flux-related voltage command;

a voltage generator for converting the two-phase voltage commands, outputted from the current controller, into voltages in three phase; and an inverter for conducting a pulse width modulation for the three-phase voltages outputted from the voltage generator, and applying the resultant voltages to the synchronous reluctance motor.

2. The speed control apparatus according to claim 1, further comprising: a magnetic command generator for receiving the output value from the rotor speed operator, thereby detecting a positive torque range and a positive output range in accordance with a rotating speed of the synchronous reluctance motor, and outputting a magnetic-flux-related current command;

a magnetic flux controller for receiving a deviation between the output signal from the magnetic command generator and a magnetic-flux-related one of the two-phase currents outputted from the second phase converter, thereby conducting a magnetic flux control for the current controller to generate the magnetic-flux-related voltage command; and a magnetic flux angle operator for receiving the output value from the rotor speed operator, thereby computing a magnetic flux angle for a coordinate conversion.

3. The speed control apparatus according to claim 1, wherein the rotor speed operator comprises:

an induced voltage operator for receiving respective outputs from the first and second phase converters, thereby calculating a voltage actually induced in the motor;

an excited current operator for receiving the respective outputs from the first and second phase converters, thereby calculating an excited current in the motor;

an induced voltage estimating operator for receiving the outputs from the second phase converter, thereby estimating a voltage induced in the motor;

an excited current estimating operator for receiving an output from the induced voltage estimating operator, thereby estimating a current excited in the motor;

a first proportional-integral controller for receiving a deviation between respective outputs from the induced voltage operator and the induced voltage estimating operator, thereby conducting a proportional-integral control; and a second proportional-integral controller for receiving a deviation between respective outputs from the excited current operator and the excited current estimating operator, thereby conducting a proportional-integral control.

4. The speed control apparatus according to claim 3, wherein said first proportional-integral controller outputs an estimated speed value.

5. The speed control apparatus according to claim 4, wherein said estimated speed value is outputted to the induced voltage estimating operator.

6. The speed control apparatus according to claim 3, wherein said second proportional-integral controller outputs a resultant value from said proportional-integral control to the induced voltage estimating operator to achieve an inductance compensation depending on a load applied to said motor.

7. A speed control apparatus for a synchronous reluctance motor comprising:
- a voltage detector for detecting a voltage applied to the synchronous reluctance motor;
- a first phase converter for receiving voltages in three phases outputted from the voltage detector based on the voltage detection thereof, and converting the three-phase voltages into equivalent voltages in two phases;
- a current detector for detecting a current applied to the synchronous reluctance motor;
- a second phase converter for receiving currents in three phases outputted from the current detector based on the current detection thereof, and converting the three-phase currents into equivalent currents in two phases;
- a rotor speed operator for receiving the two-phase voltages outputted from the first phase converter, thereby computing a speed of a rotor included in the synchronous reluctance motor;
- a magnetic command generator for receiving the output value from the rotor speed operator, thereby detecting a positive torque range and a positive output range in accordance with a rotating speed of the synchronous reluctance motor, and outputting a magnetic-flux-related current command;
- a magnetic flux controller for receiving a deviation between the output signal from the magnetic command generator and a magnetic-flux-related one of the two-phase currents outputted from the second phase converter, thereby conducting a magnetic flux control for the current controller to generate the magnetic-flux-related voltage command; and
- a magnetic flux angle operator for receiving the output value from the rotor speed operator, thereby computing a magnetic flux angle for a coordinate conversion.

8. A speed control apparatus for a synchronous reluctance motor comprising:
- a voltage detector for detecting a voltage applied to the synchronous reluctance motor;
- a first phase converter for receiving voltages in three phases outputted from the voltage detector based on the voltage detection thereof, and converting the three-phase voltages into equivalent voltages in two phases;
- a current detector for detecting a current applied to the synchronous reluctance motor;
- a second phase converter for receiving currents in three phases outputted from the current detector based on the current detection thereof, and converting the three-phase currents into equivalent currents in two phases; and
- a rotor speed operator for receiving the two-phase voltages outputted from the first phase converter, thereby computing a speed of a rotor included in the synchronous reluctance motor; and wherein said rotor speed operatore further includes
  - an induced voltage operator for receiving respective outputs from the first and second phase converters, thereby calculating a voltage actually induced in the motor;
  - an excited current operator for receiving the respective outputs from the first and second phase converters, thereby calculating an excited current in the motor;
  - an induced voltage estimating operator for receiving the outputs from the second phase converter, thereby estimating a voltage induced in the motor;
  - an excited current estimating operator for receiving an output from the induced voltage estimating operator, thereby estimating a current excited in the motor;
  - a first proportional-integral controller for receiving a deviation between respective outputs from the induced voltage operator and the induced voltage estimating operator, thereby conducting a proportional-integral control; and
  - a second proportional-integral controller for receiving a deviation between respective outputs from the excited current operator and the excited current estimating operator, thereby conducting a proportional-integral control.

9. The speed control apparatus according to claim 8, wherein said first proportional-integral controller outputs an estimated speed value.

10. The speed control apparatus according to claim 9, wherein said estimated speed value is outputted to the induced voltage estimating operator.

11. The speed control apparatus according to claim 8, wherein said second proportional-integral controller outputs a resultant value from said proportional-integral control to the induced voltage estimating operator to achieve an inductance compensation depending on a load applied to said motor.

12. A method of controlling operating speed and operating torque for a synchronous reluctance motor, said method comprising the steps of:
- detecting each phase current and each phase voltage of said motor;
- controlling rotating speed and torque of said motor based on inductance variations determined from each phase current and each phase voltage of a stator of said motor.
- determining a deviation between a desired speed command and an estimated speed value of a rotor of said motor;
- determining a magnetic flux angle of the rotor based on said estimated speed value;
- converting detected voltages and detected currents of said motor in three phases into converted two phase voltages and currents, respectively;
- calculating an induced voltage of said motor based on said converted two phase voltages and currents, respectively;
- generating a current command corresponding to torque in a q-axis direction of a rotating coordinate system of said motor based on said deviation; and
- generating a second current command corresponding to magnetic flux in a d-axis direction of said rotating coordinate system.

13. The method according to claim 12, further comprising the step of determining said estimated speed value based on a deviation between said induced voltage and an estimated induced voltage.

14. The method according to claim 13, wherein proportional-integral control is used to determine said estimated speed value.

* * * * *